Patented Aug. 21, 1945

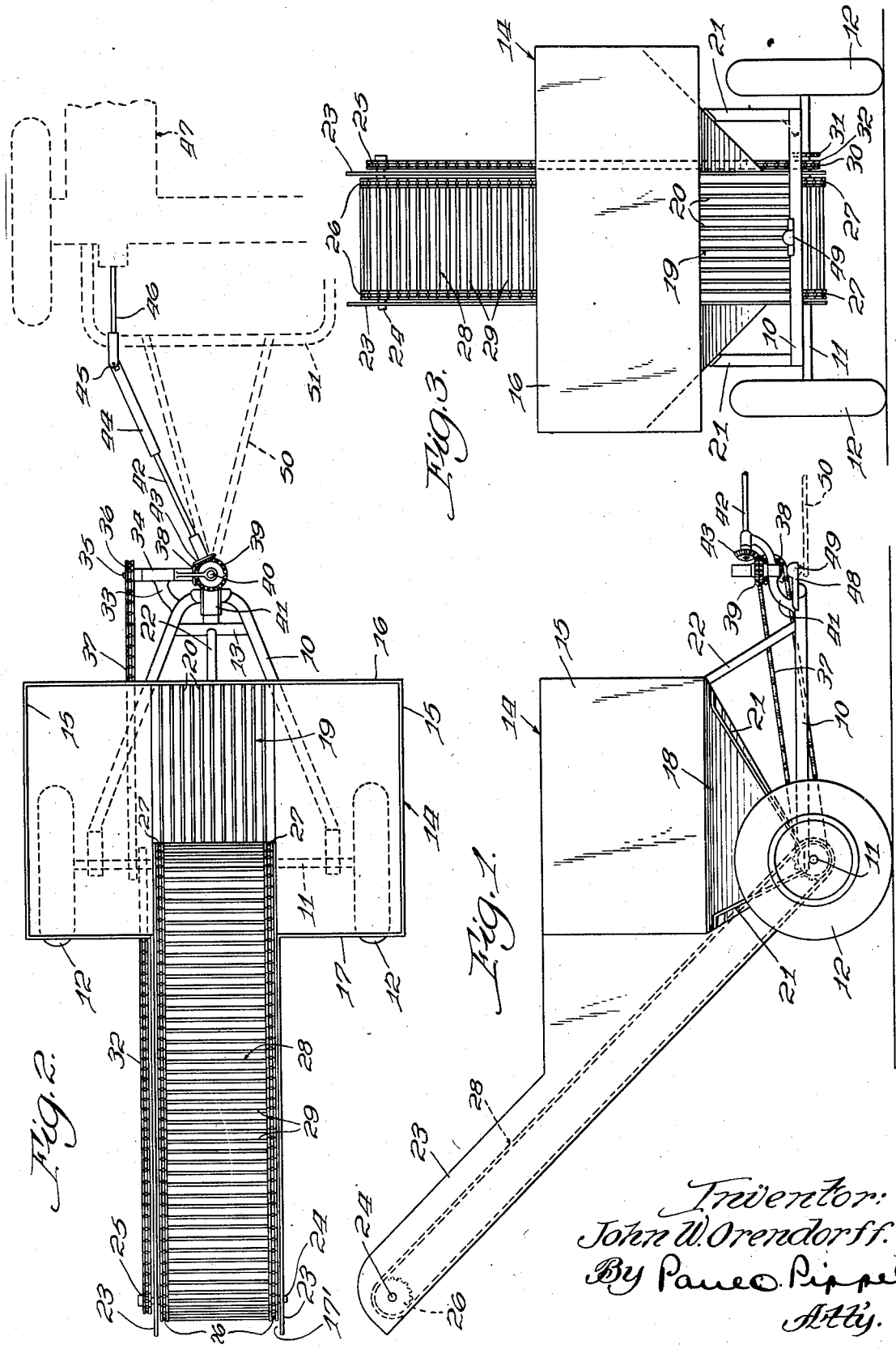

2,383,412

UNITED STATES PATENT OFFICE 2,383,412

VEGETABLE CART AND LOADER

John W. Orendorff, Canton, Ill., assignor to International Harvester Company, a corporation of New Jersey Application April 13, 1944, Serial No. 530,809

6 Claims. (Cl. 214—83)

This invention relates to agricultural implements, and particularly to a vegetable cart and loader for use in conjunction with a beet harvester or the like.

In the harvesting of beets and the like, machinery has been known for many years by which the beet tops are removed and the beets dug and deposited upon the ground, or elevated and delivered to a storage receptacle from which they are periodically dumped upon the ground or delivered to another receptacle. An object of the present invention is the provision of an improved combination cart and loader for beets and like crops which serves to accumulate harvested beets and to deliver them to another vehicle or the like. Another object is to provide a combination vegetable cart and loader which may be a part of a vegetable harvester assembly. A further object is to provide a beet cart and loader which is propelled by the same tractor that drives the harvester and including an endless conveyer which is driven by power derived from the tractor.

Other objects and advantages of the invention will become clear from the following detailed description when read in conjunction with the accompanying drawing wherein:

Figure 1 is a view in side elevation of a combination vegetable cart and loader according to the present invention;

Figure 2 is a plan view of the structure shown in Figure 1; and

Figure 3 is a front elevation of the structure shown in Figures 1 and 2.

In the drawing, the numeral 10 designates a triangular frame member having rearwardly extending, laterally spaced arms to which is secured a transverse axle 11 journaling at opposite ends thereof supporting wheels 12. The front end of frame 10 adjacent the apex thereof is provided with a cross brace 13.

Mounted upon the frame 10 is a receptacle 14 having vertically extending parallel sides 15, front wall 16, and rear wall 17. Side walls 15 are provided with inwardly inclined lower portions 18, while wall 16 is provided with a downwardly and rearwardly inclined grille portion 19 consisting of longitudinally extending, laterally spaced elements 20 serving as a floor for the container 14. From Figure 1, it will be noted that grille 19 extending downwardly and rearwardly of the container 14 terminates at a position adjacent the axle 11. Receptacle 14 is supported by side straps 21 and a front strap 22 secured to the brace 13.

The rear wall 17 of receptacle 14 is provided with an opening designated at 17' which is substantially the width of the lower front wall 19, and wall 17 is provided with laterally spaced rearward extensions 23 at each side of the opening. These extensions 23 extend upwardly and rearwardly, and a transverse shaft 24 is rotatably mounted therebetween, and one end of shaft 24 projecting beyond the extension 23 on one side has a sprocket wheel 25 keyed thereto. Between the extensions 23 a pair of laterally spaced sprockets 26 are likewise keyed to the shaft 24.

Axle 11 is preferably removably secured to frame 10 and is provided with a pair of laterally spaced sprockets 27 loosely mounted thereon and in substantial alinement with the sprockets 26 on shaft 24. Around the sprockets 26 and 27 is trained a conveyer belt 28 of conventional form provided with spaced slats 29.

It will be noted from Figures 1 and 2 that the lower end of conveyer 28 terminates at a point adjacent the rear end of lower wall 19.

The conveyer is driven by a mechanism including a pair of sprockets 30 and 31 loosely mounted on a common sleeve on axle 11, a drive chain 32 being trained around sprockets 25 and 30. To the front portion of frame 10 is secured a casting 33 provided with a transversely extending sleeve portion 34 having rotatable therein a shaft 35, upon the laterally outwardly extending end of which is mounted a sprocket 36. A chain 37 is trained around sprockets 31 and 36.

The inner end of shaft 35 has keyed thereto a bevel gear 38 which meshes with one face of a double bevel gear 39 mounted upon a spindle 40 rotatably received in a casting 41 secured to the front end of the frame 10.

Likewise rotatably mounted in an extension of casting 41 is a forwardly extending shaft 42 having keyed to the rear end thereof a bevel gear 43 meshing with one face of double bevel gear 39. The shaft 42 is preferably square in cross-section and is telescopically received for sliding movement in a sleeve 44 connected by a universal joint 45 to a drive shaft 46 of a suitable power take-off mechanism deriving power from a tractor indicated at 47. Drive is thus transmitted from the tractor through the shaft 42, bevel gears 43, 39, and 38, chain 37, sprockets 30 and 31, and chain 32 to sprocket 25 for driving the endless conveyer 28.

The combination cart and loader of the present invention is drawn by a suitable tractive vehicle, such as the tractor 47, from which the drive is likewise taken to rotate the conveyer 28. Draft from the tractor is taken through a hitch device 48, secured to the front end of frame 10 and having a cupped portion 49 adapted to be secured for pivotal movement about a vertical axis to a conventional hitch frame 50 secured to the draw-bar 51 of the tractor. Thus the vegetable cart and loader of the present invention has lateral pivotal movement with respect to the tractor by which it is drawn, and the telescopic connection of shaft 42 with sleeve 44 permits bevel gear 43 to remain in driving engagement with gear 39 at all times regardless of the angular position assumed by the cart.

In operation, beets or like vegetables removed from the soil by a harvesting mechanism, which may be a part of or driven by the tractive vehicle by which the cart is drawn, are fed to the receptacle 14. The beets drop to the bottom thereof, and any dirt loosened therefrom is carried through openings in the grille 19, the beets being accumulated adjacent the lower end of the conveyer 28. The conveyer 28, driven from the power take-off of the tractor, may be operated while the cart is being transported or while it is stationary. For example, if the cart is attached to a harvesting machine, the conveyer may be rendered inoperative until the harvester has traversed the field. If the receptacle 14 is then filled, the cart may be immobilized and the conveyer 28 placed in operation whereupon the beets fed to the lower end thereof by the contour of the receptacle 14 will be carried thereby upwardly and rearwardly and discharged therefrom, for example, into a wagon or other receptacle.

Having described the invention in its preferred embodiment, it should be understood that modifications may be made therein without departing from the spirit of the invention or the scope of the appended claims.

What is claimed is:

1. A combination vegetable cart and loader including a frame, laterally spaced wheels supporting the frame, a transverse axle journaling said wheels, a receptacle mounted on the frame comprising downwardly converging side walls, a rearwardly and downwardly inclined front wall serving as a bottom for said receptacle and terminating adjacent said axle, an opening in the rear wall of said receptacle, laterally spaced wall portions extending rearwardly therefrom at opposite sides of said opening, a shaft between said wall portions adjacent their rear ends and journaled therein, spaced sprocket wheels on said shaft, spaced sprocket wheels journaled on said axle, and an endless conveyer trained on said sprocket wheels.

2. A combination vegetable cart and loader including a frame, laterally spaced wheels supporting the frame, a transverse axle journaling said wheels, a receptacle mounted on the frame comprising downwardly converging side walls, a rearwardly and downwardly inclined front wall serving as a bottom for said receptacle and terminating adjacent said axle, an opening in the rear wall of said receptacle, laterally spaced wall portions extending rearwardly therefrom at opposite sides of said opening, a shaft between said wall portions adjacent their rear ends and journaled therein, spaced sprocket wheels on said shaft, spaced sprocket wheels journaled on said axle, an endless conveyer trained on said sprocket wheels, a drive gear for said conveyer including a centrally disposed vertical spindle supported on the front of said frame, a bevel gear on said spindle, a laterally extending stub shaft supported on said frame, a gear wheel on said shaft arranged to mesh with said bevel gear, a sprocket wheel on said stub shaft, means drivingly connecting said sprocket wheel to the conveyer shaft, a second gear wheel supported on said frame in mesh with said bevel gear, and a telescoping drive connection for said second gear wheel adapted to be connected to a source of power.

3. The combination with a tractive vehicle of a cart and loader for harvested crops comprising a triangular frame having its apex extending in the direction of draft thereupon, an axle forming the base of said triangle and extending transversely of the line of draft upon said cart, a supporting wheel at each end of said axle, a crop receptacle mounted on said frame, said receptacle having upper parallel walls and lower downwardly converging walls, the forward of said lower walls having longitudinal interstices therein, an upwardly extending and rearwardly extending endless conveyer serving as the rear wall of said receptacle with its lower end adjacent the rear end of said forward wall and journaled on said axle, a sprocket journaled on said axle laterally removed from the longitudinal center line of said cart, means drivingly connecting said sprocket and said conveyer, a transversely extending shaft on the front of said frame, a sprocket on said shaft in longitudinal alinement with the sprocket on said axle, an endless chain connecting said sprockets, a bevel gear on said shaft, a vertical spindle centrally supported on the front of said frame, a bevel gear on said spindle, a gear meshing with said bevel gear, means rigidly connecting said cart to said vehicle for lateral pivotal movement with respect thereto, and means deriving power from said vehicle for driving said gear in any position of said cart with respect to said vehicle.

4. The combination with a tractive vehicle of a cart and loader comprising a triangular frame, laterally spaced wheels supporting the frame, a transverse axle journaling the wheels, a receptacle carried by the frame and having downwardly converging walls, a conveyer forming a part of one wall of the receptacle for unloading material therefrom, hitch means pivotally connecting the frame to the vehicle for swinging movement relative thereto about a vertical axis, gearing on the frame in substantially vertical alinement with the pivotal connection of the frame to the vehicle, means drivingly connecting said gearing with the conveyer, and means deriving power from the vehicle for driving said gearing throughout the range of movement of the cart with respect to the vehicle.

5. The combination with a tractive vehicle of a cart and loader comprising a triangular frame, laterally spaced wheels supporting the frame, a transverse axle journaling the wheels, a receptacle carried by the frame and having downwardly converging walls, a conveyer forming a part of one wall of the receptacle for unloading material therefrom, hitch means pivotally connecting the frame to the vehicle for swinging movement relative thereto about a vertical axis, a first gear on the frame rotatable on a vertical axis and in substantially vertical alinement with the pivotal connection of the frame to the vehicle, and drive means deriving power from the vehicle including a second gear rotatable on a horizontal axis arranged to mesh with said first gear throughout the range of lateral pivotal movement of the cart with respect to the vehicle.

6. A combination vegetable cart and loader including a wheel-supported axle, a triangular frame, a rectangular receptacle carried by the frame, said receptacle having downwardly and inwardly inclined front, rear and side walls to form a sloping bottom, a conveyer extending upwardly and outwardly from the receptacle, said conveyer forming a part of one wall of the receptacle and having its lower end in juxtaposition with the other walls thereof, at least one of the other said walls having its bottom portion in the form of a grille having openings for the passage of dirt and trash clinging to the vegetables, and drive means for the conveyer carried by the frame.

JOHN W. ORENDORFF.